United States Patent Office 3,031,416
Patented Apr. 24, 1962

3,031,416
WHITE EMITTING ELECTROLUMINESCENT PHOSPHOR MIXTURE
George H. Morrison, Westbury, and Frank C. Palilla, Maspeth, N.Y., assignors to Sylvania Electric Products Inc., a corporation of Delaware
No Drawing. Filed Nov. 16, 1959, Ser. No. 852,960
4 Claims. (Cl. 252—301.6)

Our invention relates to electroluminescent devices and materials.

In many lighting applications, it is necessary to produce white colored electroluminescent emission. One known technique for producing white emission is to mix blue emitting zinc sulfide electroluminescent phosphors and yellow emitting zinc sulfo-selenide electroluminescent phosphors together in suitable proportions. This mixture, when electrically excited, yields blue and yellow emission having such relative intensities that a composite white light results.

This known technique, however, suffers from certain serious limitations. In particular, many critical interactions among the phosphor synthesis parameters are not quantitatively reproducible. As a result, different batches of the same material, when electrically excited, will not emit light of the same shade; i.e. the ranges of spectral emission of different batches will differ one from the other. Further, both the efficiency and the brightness of the above described phosphor mixture are low.

Accordingly, it is an object of our invention to provide a white emitting electroluminescent phosphor mixture having a reproducible range of spectral emission.

Still another object is to increase the brightness of a white emitting electroluminescent phosphor mixture.

Yet another object is to provide a new electroluminescent lamp adapted when energized to emit white light.

These and other objects of our invention will either be explained or will become apparent hereinafter.

In accordance with the principles of our invention, we produce a blue emitting electroluminescent phosphor activated with copper by first reacting a copper activated cathodoluminescent phosphor with zinc sulfate and copper sulfate. This mixture is fired at a temperature of 700°–900° C. and after cooling is washed with an alkali cyanide solution to produce the desired electroluminescent phosphor in the manner taught in our copending patent application Serial No. 852,959, filed November 16, 1959.

Similarly, we produce a yellow emitting electroluminescent phosphor activated with copper and manganese by first reacting a copper activated cathodoluminescent phosphor with zinc sulfate, copper sulfate and a manganese salt, and thereafter firing and washing the product with cyanide ion in the same manner as described above.

These yellow emitting and blue emitting electroluminescent phosphors are mixed together, the mixture being dispersed in dielectric and interposed between the electrodes of an electroluminescent lamp. When a voltage was supplied to the lamp, we found that a bright white light was produced at relatively high efficiencies. Further we found that, while the shade of the white light could be varied by varying the relative proportions of the phosphor components, any particular shade could be reproduced from different batches of phosphors and phosphor mixtures, merely by holding the relative proportions of the two components constant at some predetermined value.

Illustrative embodiments of our invention will now be described with reference to the examples which follow.

*Example I*

20 grams of a copper activated, chloride coactivated zinc sulfide cathodoluminescent phosphor were mixed with 0.5 gram of copper sulfate (a 1% addition of copper) and 7.0 grams of zinc sulfate (35% by weight of the phosphor). The mixture was loaded into a covered quartz crucible which, in turn, was placed in a muffle furnace and fired at a temperature of 800° C. for a period of 40 minutes. The crucible was then removed from the furnace and permitted to cool to room temperature.

The fired mixture was then removed from the crucible, washed first with 30 ml. of warm acetic acid (50% concentration) and thereafter washed successively with three separate 30 ml. portions of warm distilled water.

Finally, the mixture was washed with a 30 ml. portion of a hot solution of potassium cyanide (5% concentration). Thereafter, the material was washed with water, heated to dryness at a temperature of 130° C. and sieved through a 324 mesh screen.

The product was incorporated into a 5 mil gap 1 inch x 1 inch demountable electroluminescent test cell, using castor oil as a dielectric with a loading of 2 parts by weight of castor oil. Alternating voltages ranging from 60 to 400 cycles per second were applied to the cell. As described in the aforesaid patent application Serial No. 852,959, filed November 16, 1959, a blue emitting electroluminescent phosphor was obtained.

20 grams of the above identified cathodoluminescent phosphor were mixed with 0.5 gram of copper sulfate, 7.0 grams of zinc sulfate, and 0.84 gram of manganese carbonate (a 2% addition of manganese). This mixture was fired to a temperature of 800° C. and then washed with cyanide ion to remove all excess copper in the same manner as indicated above to produce a yellow emitting electroluminescent phosphor.

The two electroluminescent phosphors were mixed together in a ratio of two parts by weight of the blue emitting electroluminescent phosphor to three parts by weight of the yellow emitting electroluminescent phosphor.

This phosphor mixture was incorporated into a 5 mil gap demountable electroluminescence test cell using a castor oil as a dielectric with a loading of two parts by weight of the mixture to one part by weight of the castor oil.

When an alternating voltage of 600 volts R.M.S. at a frequency of 60 cycles per second was applied to the cell, white light was emitted. The brightness of the emitted light was about 3.5 foot lamberts, and the efficiency of the cell ranged between 3–5 lumens per watt.

*Example II*

The process of Example I was repeated using a phosphor mixture ratio of one part by weight of the blue emitting phosphor to one part by weight of the yellow emitting phosphor.

As before, white light was emitted, the shade of this white being somewhat "cooler" than that of Example I.

*Example III*

The process of Example I was repeated using a phosphor mixture ratio of one part by weight of the blue emitting phosphor to three parts by weight of the yellow emitting phosphor.

As before, white light was emitted, the shade of this white being somewhat "softer" than that of Example I.

What is claimed is:

1. An electroluminescent phosphor mixture which, when subjected to the influence of an electric field, will produce white light, said mixture consisting of
   (a) a blue emitting electroluminescent phosphor consisting of a first zinc sulfide cathodoluminescent copper activated chloride coactivated phosphor fired with 1% copper as copper sulfate and 35% zinc sulfate, said percentages being expressed by weight of said first cathodoluminescent phosphor, and (b) a yellow emitting electroluminescent phosphor component consisting of a second zinc sulfide cathodoluminescent copper activated chloride coactivated phosphor fired with 1% copper as copper sulfate, 2% manganese as manganese carbonate and 35% zinc sulfate, said percentages being expressed by weight of said second cathodoluminescent phosphor, the ratios by weight of said blue emitting electroluminescent component to said yellow emitting electroluminescent component being within the range from 1:3 to 1:1.

2. An electroluminescent phosphor mixture as defined in claim 1, wherein the ratio by weight of said blue emitting electroluminescent phosphor component to said yellow emitting electroluminescent phosphor component is approximately 1:1.

3. An electroluminescent phosphor mixture as defined in claim 1, wherein the ratio by weight of said blue emitting electroluminescent phosphor component to said yellow emitting electroluminescent phosphor component is about 1:3.

4. An electroluminescent phosphor mixture as defined in claim 1, wherein the ratio by weight of said blue emitting electroluminescent phosphor component to said yellow emitting electroluminescent phosphor component is approximately 2:3.

References Cited in the file of this patent

UNITED STATES PATENTS

| | | |
|---|---|---|
| 2,219,929 | Kaufmann | Oct. 29, 1940 |
| 2,807,587 | Butler et al. | Sept. 24, 1957 |
| 2,854,413 | Geary | Sept. 30, 1958 |
| 2,880,346 | Nicoll et al. | Mar. 31, 1959 |
| 2,911,553 | Joormann et al. | Nov. 3, 1959 |

OTHER REFERENCES

J. N. Bowtell: Electroluminescence and Its Application, Journal I.E.E., August 1957, pages 454–459.